(12) United States Patent
Leach et al.

(10) Patent No.: US 10,013,447 B2
(45) Date of Patent: Jul. 3, 2018

(54) TRANSACTION EXECUTION COMMITMENT WITHOUT UPDATING OF DATA ROW TRANSACTION STATUS

(71) Applicant: Splice Machine, Inc., San Francisco, CA (US)

(72) Inventors: John Leach, Saint Louis, MO (US); Monte Zweben, San Francisco, CA (US); Gene Davis, Hillsborough, CA (US); Scott Fines, Columbia, MO (US)

(73) Assignee: Splice Machine, Inc., San Francisco, CA (US)

( * ) Notice: Subject to any disclaimer, the term of this patent is extended or adjusted under 35 U.S.C. 154(b) by 312 days.

(21) Appl. No.: 14/720,475

(22) Filed: May 22, 2015

(65) Prior Publication Data
US 2016/0042023 A1    Feb. 11, 2016

Related U.S. Application Data

(60) Provisional application No. 62/004,762, filed on May 29, 2014.

(51) Int. Cl.
*G06F 17/30* (2006.01)
*G06F 9/46* (2006.01)

(52) U.S. Cl.
CPC ........ *G06F 17/30368* (2013.01); *G06F 9/466* (2013.01); *G06F 17/30371* (2013.01); *G06F 17/30876* (2013.01)

(58) Field of Classification Search
None
See application file for complete search history.

(56) References Cited

U.S. PATENT DOCUMENTS

| | | | |
|---|---|---|---|
| 6,553,392 B1* | 4/2003 | Mosher, Jr. | G06F 11/2069 |
| 7,103,586 B2* | 9/2006 | Holenstein | G06F 11/2064 |
| 7,424,499 B2* | 9/2008 | Lomet | G06F 17/30353 |
| 7,966,298 B2* | 6/2011 | Bruso | G06F 17/30362 707/675 |
| 9,654,844 B2* | 5/2017 | Kim | H04N 21/8133 |
| 2005/0166091 A1 | 7/2005 | Boylan et al. | |
| 2006/0235853 A1* | 10/2006 | Luo | G06F 9/466 |
| 2010/0023560 A1* | 1/2010 | Erb | G06F 17/30362 707/E17.01 |
| 2011/0153566 A1 | 6/2011 | Larson et al. | |
| 2011/0238641 A1 | 9/2011 | Labuda et al. | |

* cited by examiner

*Primary Examiner* — Debbie Le
(74) *Attorney, Agent, or Firm* — Van Pelt, Yi & James LLP

(57) ABSTRACT

A system for executing a plurality of transactions comprises a first processor and a memory. The first processor is configured to execute a first transaction comprising: providing a plurality of indications to make a plurality of first changes to a plurality of first records of a database; and committing the first transaction by updating the status of the first transaction in a transaction table while not providing an indication to update the status of the first records from pending. The memory is coupled to the first processor and configured to store the transaction table.

24 Claims, 11 Drawing Sheets

400

Transaction Table

| Begin Time Stamp | Status | Commit Time Stamp | Parent ID |
|---|---|---|---|
| 1 | COMMITTED | 2 | |
| 3 | COMMITTED | 6 | 1 |
| 4 | COMMITTED | 5 | |
| 6 | FAILED | | 4 |
| 8 | ACTIVE | | 4 |
| 10 | COMMITTED | 11 | 1 |

FIG. 4

| Timestamp | Event | Value | Commit Timestamp |
|---|---|---|---|
| 1 | t1 begin | | |
| | t1 update | 21@1 | |
| 2 | t1 commit | | 2@1 |
| 3 | t3 begin | | |
| | t3 update | 22@1 | |
| 4 | t3 commit | | 2@1 |
| 5 | t5 begin | | |
| | t5 update | 23@1 | |
| | t5 rollback | | |
| 6 | t6 begin | | |
| 7 | t7 begin | | |
| | t7 update | 24@1 | |
| | t6 update - FAIL | | |
| 8 | t7 commit | | |

Database Data

FIG. 5

TRANSACTION EXECUTION COMMITMENT WITHOUT UPDATING OF DATA ROW TRANSACTION STATUS

This application claims priority to U.S. Provisional Patent Application No. 62/004,762 entitled TRANSACTION EXECUTION COMMITMENT WITHOUT UPDATING OF DATA ROW TRANSACTION STATUS filed May 29, 2014 which is incorporated herein by reference for all purposes.

BACKGROUND OF THE INVENTION

When performing an update to a distributed database, it is crucial to guarantee that all parts of the update (e.g., across a distributed set of database servers) have been performed before indicating that the update is committed. There additionally needs to be a single arbiter of the commit information such that a firm conclusion can be determined regarding whether the transaction has been committed or is still in process.

BRIEF DESCRIPTION OF THE DRAWINGS

Various embodiments of the invention are disclosed in the following detailed description and the accompanying drawings.

FIG. 4 is a diagram illustrating an embodiment of a transaction table.

FIG. 5 is a diagram illustrating an embodiment of database data.

DETAILED DESCRIPTION

Figure 1:
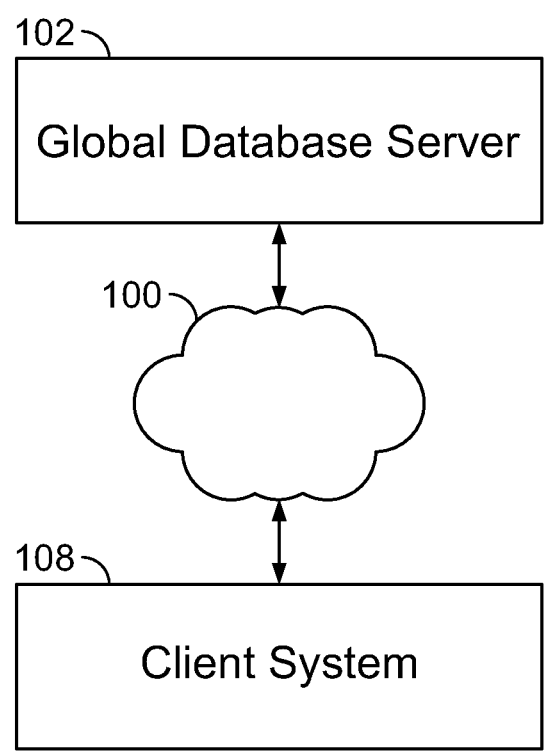
FIG. 1 is a block diagram illustrating an embodiment of a database system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for executing a plurality of transactions comprises a first processor and a memory. The processor is configured to execute a first transaction, wherein executing the first transaction comprises providing a plurality of indications to make a plurality of first changes to a plurality of first records of a database and committing the first transaction by updating the status of the first transaction in a transaction table while not providing an indication to update the status of the first records from pending. The memory is coupled to the processor and configured to store the transaction table.

In some embodiments, a system for executing a plurality of transactions comprises a global database server and a plurality of distributed database systems (e.g., compute workers and/or database region servers) communicating via a network. The global database server receives database transactions from a database user and delivers appropriate database commands to the distributed database systems in order to execute the transactions received from the database user. The global database server is able to process transactions that involve large amounts of data stored across the multiple distributed database systems. When the global database server carries out an update data transaction, it provides indications to the appropriate distributed database systems to make changes. The global database server maintains a transaction table indicating the state of transactions carried out. While the global database server is carrying out an update data transaction, the transaction state in the transaction table is indicated as active. Once the global database server has made all of the changes for the transaction, the transaction state in the transaction table is updated to committed.

In some embodiments, each data record stored on each distributed database system includes a log of the transactions that have modified it, along with their current state. Once the transaction state of the transaction in the transaction table on the global database server has been updated to committed, the transaction state associated with each modified record can be updated to committed. In some embodiments, it is advantageous to not update the transaction state associated with each modified record immediately. The network traffic to communicate with each distributed database system needs to be repeated, consuming bandwidth that may be needed for more pertinent tasks. In some embodiments, modifying the transaction status associated with records stored on distributed database systems is postponed by placing the transaction into a roll-forward queue and updating the status of modified data records from all transactions in the roll-forward queue at a later point when bandwidth is less valuable—for example, late at night.

In some embodiments, in the event that a second transaction modifies a data record that has been modified by a first transaction but for which the transaction status was left as pending (e.g., active), the second transaction does not immediately know whether the first transaction is truly still active or whether the transaction status associated with the data record has not yet been updated. In order to make this determination, the distributed database system requests the transaction status of the first transaction as it is indicated in the transaction table stored on the global database server. In the event that the transaction table indicates the transaction is committed, the transaction status associated with the data record is updated, and the second transaction can proceed. In some embodiments, prior to checking in the transaction table on the global database server, a local transaction table cache or metadata is checked on a local server (e.g., a distributed database system, a server where the data record has been modified or updated, etc.).

FIG. 1 is a block diagram illustrating an embodiment of a database system. In the example shown, the database system includes network 100, global database server 102 (e.g., including one or more compute workers), and client system 108. In various embodiments, network 100 comprises one or more of the following: a local area network, a wide area network, a wireless network, a cellular network, a wired network, a wireless network, the Internet, an intranet, a storage area network, or any other appropriate communication network or combination of networks. Client system 108 comprises a client system (e.g., a computing system for operation by a user). In some embodiments, client system 108 comprises a system accessed by a user directly (e.g., the user is in proximity with client system 108). In some embodiments, client system 108 comprises a system accessed by a user remotely (e.g., the user is not in proximity with client system 108 and accesses client system 108 via network 100 using a separate user system). Client system 108 comprises a system running enterprise software (e.g., business software for creating data, storing data, transmitting data, receiving data, etc.). Client system 108 comprises a system for storing data on a database system, processing data, and/or retrieving stored data from a database system. In various embodiments, there are 1, 4, 17, 22, 1459, or any other appropriate number of client systems communicating with network 100. Global database server 102 comprises a computer system for coordinating database data. Global data base server 102 includes distributed database systems (e.g., distributed compute workers and/or distributed database region servers) for storing database data. In various embodiments, there are 2, 3, 4, 12, 22, 117, or any other appropriate number of distributed database systems communicating with network 100. In some embodiments, a global database server and one or more distributed database systems comprise a database system. In various embodiments, a database command (e.g., a database write command or a database read command) is received by, is provided by, is generated by global database server 102, or any other appropriate relation with respect to global database server 102. Global database server 102 coordinates sending database data to and/or retrieving database data from one or more distributed database systems. In various embodiments, global database server 102 receives, provides, or generates, concurrent database commands (e.g., from multiple client systems). Global database server 102 processes concurrent database commands in such a way as to avoid inconsistency or errors. In some embodiments, the distributed database system of FIG. 1 comprises an Apache HBase system.

Figure 2A:
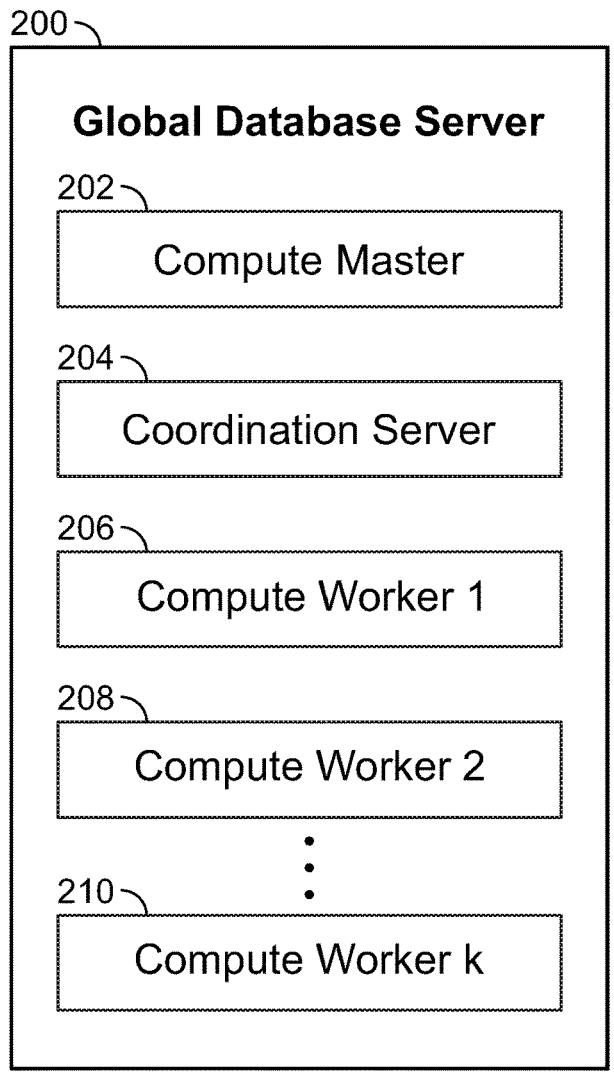
FIG. 2A is a block diagram illustrating an embodiment of a global database server.

FIG. 2A is a block diagram illustrating an embodiment of a global database server. In some embodiments, global database server 200 comprises global database server 102 of FIG. 1. In the example shown, global database server 200 comprises compute master 202, coordination server 204, and a plurality of compute workers (e.g., compute worker 1 206, compute worker 2 208, compute worker k 210, etc.). The plurality of compute workers include a distributed stored index and a distributed stored transaction table (e.g., the index and the transaction table are stored distributed over a number of the compute worker s—for example, all compute worker s, a subset of compute worker s, etc.). The distributed stored index comprises an index of data locations on database compute worker s (e.g., for any piece of data stored by the database system, the distributed stored index (e.g., a database compute worker index) stores an indication of which database compute worker the piece of data is stored on). Coordination server 204 includes a pseudo-time generator. The distributed stored transaction table comprises a table of all transactions (e.g., a set of processing, read, and/or write operations) executed by global database sever 200. In some embodiments, each transaction comprises a begin time stamp, a status, and a completion time stamp. The transaction table comprises the ultimate arbiter of transaction status (e.g., the state of the transaction). In some embodiments, the distributed stored transaction table is durable (e.g., stored in such a way that in the event of a failure such as a power outage that the state of the table prior to the failure is available after the failure has been recovered from).

Figure 2B:
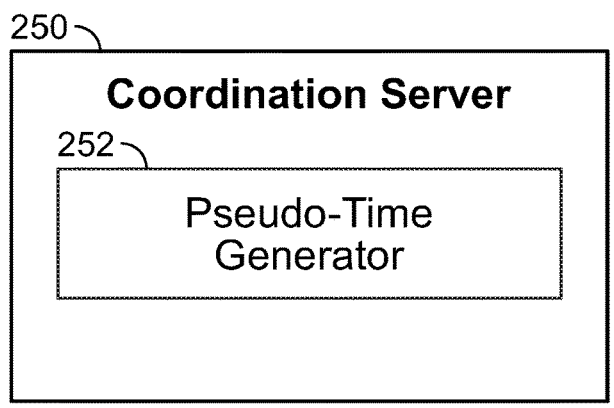
FIG. 2B is a block diagram illustrating an embodiment of a coordination server.

FIG. 2B is a block diagram illustrating an embodiment of a coordination server. In some embodiments, coordination server 250 implements coordination server 204 of FIG. 2A. In the example shown, coordination server 250 includes pseudo-time generator 252. Pseudo-time generator 252 produces monotonically increasing sequence numbers. In some embodiments, pseudo-time generator 252 receives an indication to produce a sequence number, and produces a sequence number in response to the indication. Pseudo-time generator 252 guarantees that if a first sequence number is produced before a second sequence number, the first sequence number will have a lower value than the second sequence number. In some embodiments, pseudo-time generator 252 comprises a clock (e.g., when queried for a sequence number, pseudo-time generator 252 outputs the current time). In some embodiments, pseudo-time generator 252 comprises a counter (e.g., when queried for a sequence number, pseudo-time generator 252 outputs a sequence number that is one (or more) greater than the previous sequence number).

Figure 3:
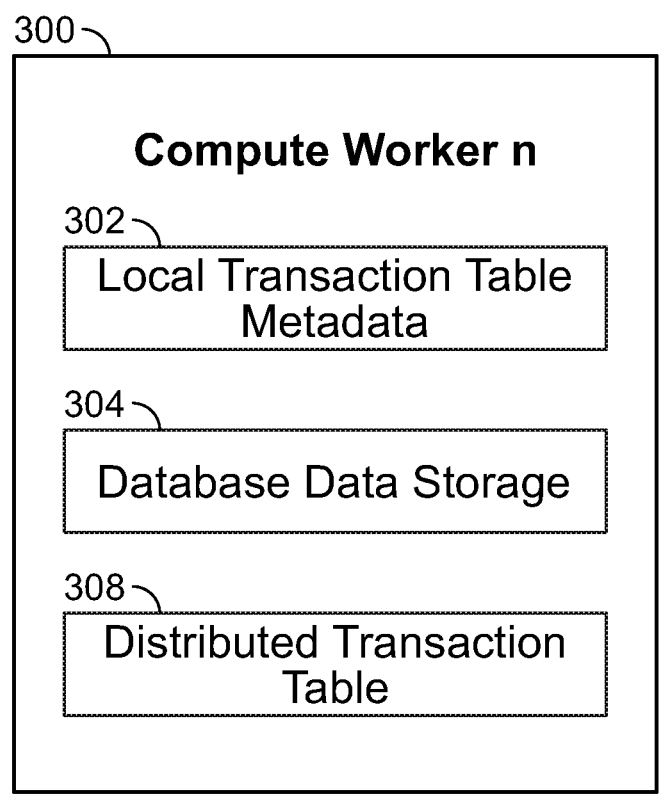
FIG. 3 is a block diagram illustrating an embodiment of a database compute worker.

FIG. 3 is a block diagram illustrating an embodiment of a database compute worker. In some embodiments, database compute worker n 300 comprises database compute worker 1 206, compute worker 2 208, or compute worker k 210 of FIG. 2. In the example shown, database compute worker n 300 comprises local transaction table metadata 302, database data storage 304, and distributed transaction table 308. Local transaction table metadata 302 comprises a metadata of a transaction table stored distributed across database compute workers. In various embodiments, transaction table updates are sent from a global database server to database compute worker 300 whenever the transaction table, which is stored distributed across a number of database compute workers, is updated by the global database server is updated, on a fixed schedule (e.g., once a minute, once an hour, etc.), whenever an update is required, or at any other appropriate point in time. Database data storage 304 comprises storage for database data. In some embodiments, database data storage 304 comprises versioned data storage (e.g., whenever database data is modified, a new entry is made indicating the new value of the database data and the effective time of the new value, e.g., without deleting the old database data information). Database data storage 304 stores transaction information associated with database data (e.g., a transaction identifier of a transaction modifying a piece of database data, a transaction status of a transaction modifying a piece of database data, a transaction completion time of a transaction that modified a piece of database data, etc.).

In some embodiments, a distributed database system comprises a system for providing distributed transactions in a distributed database. A fundamental problem in providing distributed transactions in a distributed database (e.g., Apache HBase) comes down to the "consensus problem", in which a collection of processes running on machines and communicating across a network must come to a shared agreement concerning a value (especially in situations where the machines and the network are imperfect). A distributed coordination system including an atomic broadcast protocol (e.g., Apache ZooKeeper, including ZooKeeper Atomic Broadcast protocol) is used to help solve this problem.

In some embodiments, the atomic broadcast protocol provides the following:

Pseudo-time—a shared pseudo-time source provides a monotonically increasing sequence numbers (e.g., pseudo-time generator 252 of FIG. 2B). This is implemented on top of the atomic broadcast protocol sequence values. A distributed consensus is reached regarding the current value of the pseudo-time counter. Since the pseudo-time source gives out monotonically increasing values, the pseudo-temporal order of two pseudo-timestamps can be related to actual time. Specifically, if pseudo-timestamp-1 is less than pseudo-timestamp-2 then it can be said that pseudo-timestamp-1 was produced before pseudo-timestamp-2. The pseudo-times can then be used to determine a temporal order of events for the system.

Transaction status—all participants are able to see a consistent value for the status of a transaction. This requires consistency in accessing a database compute worker for the database data storage holding a transaction row. Ultimately, this is accomplished by relying on the atomic broadcast protocol to provide a basis for agreeing on which server to access (e.g., using distributed index 306 of FIG. 3). Furthermore, the distributed database durably writes values and manages fail-over between compute workers to provide a consistent, fault-tolerant view of the transaction status (e.g., using distributed transaction table 308 of FIG. 3). Fundamentally the transaction status issue is about reaching a distributed consensus regarding the value of a given transaction's status.

Data rows—a consistent view of data rows is obtained. Just as for transactions, the underlying features of the distributed database and the atomic broadcast protocol are relied upon to provide consistent view of data rows. Furthermore, explicit locking is used to allow atomic read/write combinations of individual data rows. That is, rows are locked, rows are read, the status of the data updates to the rows are determined based on pending/previous transactions, updates are applied, and then the rows are un-locked.

In some embodiments, the basic transaction flow from a client perspective is the following sequence BEGIN_WORK; ACTIVITY; and COMMIT_WORK:

BEGIN_WORK—A call into the transaction manager to begin the transaction;

ACTIVITY—during this phase, database read and write operations occur as part of the transaction;

COMMIT_WORK—A call into the transaction manager to commit all of the transaction's activity;

In some embodiments, instead of COMMIT_WORK, the client could call ROLLBACK_WORK:

ROLLBACK_WORK—Abandon all of the transaction's activity.

In some embodiments, the following are assumptions about the sequence of the transaction flow:

BEGIN_WORK—this is completed before any ACTIVITY is performed and assigns a begin pseudo-timestamp to the transaction;

ACTIVITY—this involves many transaction participants running in parallel; Concretely, this means that reads and writes occur in parallel on many database regions;

COMMIT_WORK—this is not called until and unless all ACTIVITY has successfully been durably recorded and assigns a commit pseudo-timestamp to the transaction; the begin and commit timestamps come from a single pseudo-time source that is shared for all transactions across the system.

Combining these assumptions, the begin pseudo-timestamp for every transaction will be assigned before any ACTIVITY occurs for the transaction and the commit pseudo-timestamp for a transaction will not be assigned until all ACTIVITY for the transaction has been successfully, durably recorded. Each transaction record is stored in the distributed database under a row key which corresponds one-to-one with the begin pseudo-timestamp of the transaction. In some embodiments, the begin pseudo-timestamp is used as a globally unique transaction identifier. The transaction status is modeled as a state-machine with the following transitions:

null→ACTIVE@begin pseudo-timestamp;
ACTIVE→COMMITTING;
COMMITTING→COMMITTED@commit pseudo-timestamp;
COMMITTING→FAILED;
ACTIVE→FAILED;

The meanings of these states are:

ACTIVE—the transaction has begun, but has not yet committed or failed;

COMMITTING—the transaction is in the process of being committed;

COMMITTED—the transaction has permanently committed; and

FAILED—the transaction has permanently failed either due to a client requested rollback or because the system detected a problem with the transaction.

Since this state machine is a directed-acyclic graph, each transition can only occur one time. There are two terminal states: COMMITTED and FAILED. Once these states are reached the transaction status cannot change.

In some embodiments, the committing state is not present. For example, the state machine moves from ACTIVE→COMMITTED.

In some embodiments, the transaction status transitions occur using a checkAndPut operation. checkAndPut is a realization of the idea generally known as "compare-and-swap". The operation atomically checks a value, confirms it matches the expected value, and then changes the value.

checkAndPut is able to deal with race conditions in which two processes attempt to simultaneously change the status of a transaction. The commit pseudo-timestamp of a transaction is a part of the transaction status because it is set as part of the same checkAndPut operation that changes the status from COMMITTING to COMMITTED. Therefore, it is an atomic part of the transaction status change. A transaction is only assigned a single commit pseudo-timestamp, and once it is assigned, it does not change.

Commit Sequence

In some embodiments, the sequence of steps to perform a COMMIT_WORK operation are:

1) attempt to change the transaction status from ACTIVE to COMMITTING;

2) obtain a candidate commit pseudo-timestamp from the global pseudo-time source;

3) attempt to change the transaction status from COMMITTING to "COMMITTED at <commit pseudo-timestamp>".

If either attempted transaction status change fails, the commit sequence is abandoned. This is because if the checkAndPut fails, one of the following has occurred:

1) another process is committing or has committed the transaction, let that process proceed and continue;

2) another process has failed the transaction, then the process is not eligible to commit; and 3) the database region hosting the transaction record is not available, then the process for transaction to commit cannot proceed.

Based on the temporal sequence of the commit steps, the commit pseudo-timestamp for a given transaction will not have been produced by the pseudo-time source until after the transaction status has been changed to COMMITTING. This temporal ordering is a key to the approach.

Transactional Data

In some embodiments, a row in a user table is represented as a row in a database table. All writes to a given row include an indicator of what transaction made the change (e.g., writing a value to a cell, writing a delete tombstone marker to the metadata, etc.). The transaction identifier of the transaction performing the update is stored as the database timestamp field and thus is atomically updated with the rest of the row data.

Transaction Interaction

In some embodiments, when a data row is read or written to, an active transaction interprets the existing row data in light of the status of a previous transaction that wrote each part of the existing data. To provide snapshot isolation between transactions, the key question to understand is whether the previous writing transaction committed before the current active transaction began. There are three fundamental cases to consider:

1) the previous writing transaction (e.g., T1) is committed before the current active transaction (e.g., T2) begins, in which case the data changes should be used by the current active transaction (e.g., T2);

2) the previous writing transaction (e.g., T1) was/will be committed after the current active transaction (e.g., T2) begins, in which case the data changes should be ignored by the current active transaction (e.g., T2); and 3) the previous writing transaction (e.g., T1) eventually fails, in which case the data changes should be ignored by the current active transaction (e.g., T2).

ACTIVITY being performed on behalf of T2 that is accessing (either reading or writing) row data that was created by transaction T1 will check the status of T1 in order to interpret the data. When checking the status of T1, the T2 ACTIVITY will apply the following logic based on the observed T1 status:

ACTIVE—ignore the data because it is impossible for T1 to commit before T2 started. This is because if the current status is ACTIVE, then T1 has not yet transitioned to COMMITTING. If it has not yet transitioned to COMMITTING, then a commit pseudo-timestamp has not yet been obtained for it. Therefore, the final T1 commit pseudo-timestamp, if there is one, will be after the begin timestamp of T2;

COMMITTING—wait until the status takes on a terminal value (e.g., either COMMITTED or FAILED);

COMMITTED—use the commit pseudo-timestamp to determine whether T1 commit pseudo-timestamp is <T2 begin pseudo-timestamp. If it is, then consider the data as valid. Otherwise ignore the data; and FAILED—ignore the data.

A special case exists if T1 and T2 are the same transaction. In this case, the data changes from T1 are always considered valid. In all cases, T2 ACTIVITY will decide to either ignore the data or use the data. For correctness all T2 ACTIVITY running in parallel, across time, and across machines must reach the same conclusion regarding whether to ignore or use the data changes from T1.

In some embodiments, the detailed cases are as follows:

A) T1 eventually commits

There must be one of the following relationships between T1 and T2:

1) T1 commit pseudo-timestamp <T2 begin pseudo-timestamp;

In this case we can reason as follows:

a. the T1 status change from ACTIVE to COMMITTING happened before the T1 commit pseudo-timestamp was assigned (according to the commit logic);

b. the T1 commit pseudo-timestamp was assigned before the T2 begin pseudo-timestamp was assigned (this is the assumption of the case we are considering)

c. the T2 begin pseudo-timestamp was assigned before T2 ACTIVITY (based on the assumption that BEGIN_WORK completes before transaction ACTIVITY begins)

d. Therefore, transitively it is known that all of T2 ACTIVITY occurs after T1 status was changed to COMMITTING. Therefore, all of T2 ACTIVITY will see T1 in one of two states: either COMMITTING or COMMITTED. Since all ACTIVITY seeing COMMITTING will wait until the COMMITTED state is reached, we conclude that all ACTIVITY will see T1 as COMMITTED. We have reached correct, distributed consensus.

This analysis applies regardless of which process performs the commit sequence for T1. In fact, the commit sequence for T1 can be cooperatively executed by different processes as long as the order of commit steps is preserved (e.g., first status changes to COMMITTING, then a commit pseudo-timestamp is obtained, then status changes to COMMITTED). When failure recovery is considered, there are cases where the commit steps are executed by different processes.

The case where the commit process is begun, but fails, is considered below. The current case only covers situations where T1 ultimately commits.

2) T1 commit pseudo-timestamp >T2 begin pseudo-timestamp

T2 ACTIVITY can see T1 in one of these three states:

a. ACTIVE—T1 will be ignored;

b. COMMITTING—the ACTIVITY will wait until T1 is COMMITTED, see next item;

c. COMMITTED—T1 data changes will be ignored based on the pseudo-timestamp;

Therefore we have reached, correct distributed consensus. All T2 ACTIVITY will ignore T1.

B) T1 eventually fails

All T2 ACTIVITY will see T1 status as one of:

a. ACTIVE—T1 will be ignored;

b. COMMITTING—the ACTIVITY will wait until T1 is FAILED, see next item;

c. FAILED—T1 will be ignored;

So, all T2 ACTIVITY will reach the same conclusion that T1 is to be ignored. Correct, distributed consensus is reached regarding T1.

C) T1 and T2 are the same transaction and T1 eventually commits.

In this case, all T2 ACTIVITY occurs after T2 BEGIN_WORK and before T2 COMMIT_WORK. Therefore, all T2 ACTIVITY will see T1 status as ACTIVE. But more importantly, T1 data changes are considered valid since T1 is the same transaction as T2. So, all T2 ACTIVITY reaches the same conclusion regarding T1.

D) T1 and T2 are the same transaction and T1 eventually fails.

All T2 ACTIVITY will see T1 status as either:

a. ACTIVE—the T1 changes are considered valid;

b. FAILED—T1 changes are ignored; but more importantly, the current ACTIVITY is abandoned since this means that T2 is already considered FAILED.

In this case, T2 ACTIVITY reaches inconsistent conclusions about the status of T1. However, this does no harm and is irrelevant since T1, and therefore T2, fails. When transactions fail, the system makes no guarantees about whether the T2 ACTIVITY was all completed. It is acceptable for some of the T2 ACTIVITY to be recorded and some other parts to have never been applied.

The previous analysis applies to all interacting transactions. So, for example, if there are three transactions T1, T2, and T3, all running concurrently then we can apply this analysis to the following pairs to see that all interactions are correct: (T1, T2); (T2, T1); (T1, T3); (T3, T1); (T2, T3); (T3, T2); (T1, T1); (T2, T2); (T3, T3).

Alternate Handling of COMMITTING Status

In the scenarios above, when ACTIVITY for a transaction T2 views data from another transaction T1 in the COMMITTING status, T2 must wait until T1 reaches a terminal state (e.g., either COMMITTED or FAILED). The logic described above calls for T2 to wait until T1 enters a terminal state. In some embodiments, there are two possible additional actions that T2 ACTIVITY takes that do not violate the validity of the analysis presented above:

The T2 ACTIVITY changes the T1 status from COMMITTING to FAILED; or

The T2 ACTIVITY continues executing the commit logic on T1. Specifically, this means that T2 obtains a new candidate commit pseudo-timestamp for T1. Then, T2 attempts to change the T1 status from COMMITTING to "COMMITTED at the pseudo-timestamp value".

This highlights the distributed, symmetric nature of our approach. Any of the participating processes can step in to complete or abandon the commit process once it is begun. This approach also means that participants never have to wait indefinitely on a transaction status before proceeding (unless there is a network partition or other catastrophic failure).

The timestamps of transaction status changes are recorded in the database timestamp field. Assuming all nodes have approximately synchronized clocks, this allows a process to know approximately how far in the past a status change was applied. In some embodiments, this information is used in heuristics applied to deciding what action to take when a COMMITTING status is encountered.

Transaction Status Storing

In some embodiments, the system caches relevant transaction status values of data rows. The transaction status can be one of:

ACTIVE—this value will not be considered reliable since ACTIVE is a transient status. The transaction row will always be consulted if the transaction status is needed;

COMMITTED or FAILED—since this is a terminal state, the status indicator in the cache can be considered definitive and there is no need to access the transaction record (e.g., the transaction table).

This caching of the transaction status is not essential for the correct operation of our approach, but it does improve the efficiency and avoids creating a hot-spot accessing a transaction record. Once a transaction's terminal status is recorded in the data row cache, the transaction record or row storing the transaction data does not need to be consulted again regarding that row's data.

Transaction Status Refinements

In some embodiments, when accessing a row, it is necessary to assess the status of other transactions to know how to interpret the data. Considering the possible transaction status values gives us these cases:

COMMITTED or FAILED—transaction is committed or failed (i.e., rolled back);

ACTIVE—the transaction is active;

The basic premise, described earlier is that when a transaction is seen in the ACTIVE state, then it cannot possibly commit before our current running transaction started. This means the data changes can be ignored for the purposes of snapshot isolation reads. In some embodiments, the data changes cannot be ignored for writes because of first writer wins. However, consider a running transaction T2 checking the status of another transaction T1. Once T2 observes T1 is ACTIVE at a certain pseudo-time then in the future, the status of the same transaction at the same pseudo-time will be the same: ACTIVE. Of course the baseline "certain pseudo-time" is the begin time of T2. Similarly, if the status of T1 is active at a certain pseudo-time, then T1 could not possibly have committed if the status was checked as of earlier pseudo-times.

In some embodiments, the refinements described below enable avoiding accessing a given transaction status repeatedly when by using a cached value instead.

Begin Pseudo-timestamp Ordering—if the begin pseudo-time of T1 is after the begin pseudo-time of T2, then T1 cannot have committed before T2 began and can be ignored for snapshot-isolation purposes.

Cache Pseudo-time—an implication of this is that the local transaction cache can include in the cache the pseudo-timestamp at which a transaction status is observed. Then, if the same transaction or any transaction with an earlier begin time needs to know the status of the transaction, the cached value can be used.

Report Current Pseudo-time with Transaction Status—when a transaction status is retrieved as part of accessing a data row, record the current pseudo-time as part of the transaction record. Truly this would be the last observed pseudo-time rather than the current time. For this approach the question becomes: how to detect the current pseudo-time? Or, an easier question to answer: what is the largest pseudo-time that is known to be in the past? One way to do this is that a given cache can remember the largest pseudo-time value that it has seen as a transaction begin time. This will lag the true current pseudo-time, but can safely be used as an approximation to the current pseudo-time Compute Worker Level Transaction Cache or Metadata— consider the case where many rows served by a Compute Worker are modified by a transaction T1 and later those same rows are accessed by transaction T2. A Compute Worker level metadata of the transaction status is checked rather than checking the status of transaction T1 on another server on behalf of each data row. This avoids making multiple remote calls to obtain the transaction status. The Compute Worker level transaction status metadata stores ACTIVE transactions along with the observation pseudo-time.

Roll-Forward

When it is observed that a transaction metadata is potentially out of date, an asynchronous process is scheduled to update that data row's metadata of a given transaction's status. This update process is referred to as "rolling forward" the transaction status to the metadata. The metadata is only updated if the transaction is in a terminal state (e.g., COMMITTED or FAILED).

Transaction Timeouts

In some embodiments, if a transaction is found to be in status ACTIVE or COMMITTING and from the timestamps it is concluded that a timeout period has expired, the ACTIVITY process can either attempt to transition the transaction from ACTIVE to FAILED, COMMITTING to FAILED, or COMMITTING to COMMITTED. Allowing this makes the system resilient to abandoned transactions.

In some embodiments, for long-running transactions there is a keep-alive mechanism that allows a transaction to be updated with a current timestamp in order to prevent the timeout from expiring.

In some embodiments, reading and writing data for a transaction process are as follows:

1) Begin Transaction

Obtain a transaction begin timestamp that is after all currently committed timestamps.

Insert this timestamp into the transaction table with a status of ACTIVE.

2) Look Up Transaction

First check the "commit timestamp" column of the current row. If a pair exists then it will give <commit time>@<start time> for a given transaction.

Then check the transaction metadata for the transaction.

Then lookup the transaction in the transaction table (and update the metadata).

Asynchronously roll-forward the "commit timestamp" entry into the current row if it didn't exist already.

3) Check Cell Validity

Look up the transaction associated with the effective time of the cell;

If the transaction is FAILED/ROLLED BACK/ACTIVE, then ignore this cell;

If the transaction is COMMITTED, then use this cell and ignore the rest of the cells in the column;

If the transaction is COMMITTING, then force the transaction to complete;

a. If it completes before start time of the transaction, then use this cell and ignore the rest of the cells in the column.

b. If it completes after start time of the transaction, then ignore this cell.

4) Read

Only consider KeyValues whose timestamp is <= start time of transaction

Identify the tombstone to use by starting at the most recent tombstone, for each tombstone:

(Check Cell Validity)

Only consider the attribute KeyValues whose timestamp is > most recent tombstone timestamp.

Identify the value for each qualifier by: for each attribute qualifier, start at the most recent KeyValue:

(Check Cell Validity)

Use the set of values of each qualifier as the value for the row.

5) Write

Lock the row

Consider commit timestamp column of row being updated. Look for entries whose effective time is > start time of transaction. If any entries are found whose associated transaction is ACTIVE, COMMITTED, or COMMITTING, then rollback due to write/write conflict.

Register a commit callback for the affected row (unless there are more than X rows being updated).

Release the row lock

6) Commit

Update the transaction status to COMMITTING.

Obtain a commit timestamp.

Update the transaction commit time to the commit timestamp. (NOTE: the commit timestamp might have already been set by another process).

Asynchronously update each row affected by the transaction to include the "commit timestamp" value of "commit time of transaction@start time of transaction." This uses the commit callback entry created as part of the write.

7) Rollback/Fail

Update the transaction status to ROLLBACK/FAIL.

8) Compaction

Remove cells whose timestamp corresponds to a transaction that rolled back or failed. This applies both to attribute cells and to tombstone cells.

FIG. 4 is a diagram illustrating an embodiment of a transaction table. In some embodiments, transaction table 400 is stored distributed across a number of compute workers (e.g., a plurality of different portions of transaction table—for example, distributed transaction table 308 of FIG. 3). In the example shown, transaction table comprises a log of transactions executed by the database system. Each transaction comprises a transaction identifier (e.g., a begin time stamp). In some embodiments, the transaction identifier comprises a pseudo-time value received from a pseudo-time generator (e.g., pseudo-time generator 252 of FIG. 2B). Each transaction additionally comprises an indication of whether the transaction is read-only. In various embodiments, a transaction is determined to be read-only based on its transaction type, the client system executing the transaction, the data the transaction is operating on, or based on any other appropriate transaction criteria. In some embodiments, read-only transactions are omitted from the transaction table. Each transaction additionally comprises a transaction status. In various embodiments, the transaction status comprises one of the following: ACTIVE, COMMITTED, COMMITTING, FAILED, ROLLED-BACK, or any other appropriate transaction status. In some embodiments, when a transaction is created its status comprises ACTIVE. In some embodiments, when a transaction is completed its status is changed to COMMITTED. In some embodiments, when a transaction is completed a completion time is assigned (e.g., a completion time received from a pseudo-time generator). In some embodiments, when a transaction is completed, its status is changed to COMMITTING, a completion time is assigned, and its status is changed again to COMMITTED. In some embodiments, when a transaction is completed, a completion time is assigned, and its status is changed again to COMMITTED. In some embodiments, in the event a transaction with ACTIVE status fails, its status is changed to FAILED. In some embodiments, in the event a transaction with ACTIVE status is rolled back, its status is changed to ROLLED-BACK. Transaction table 400 includes entries for beginning time stamps 1, 3, 4, 6, 8, and 10. The transaction associated with beginning time stamp 1 has status indicator indicating COMMITTED, a commit time stamp of 2, and a null parent ID (e.g., a null parent ID indicates that the transaction is a top level parent). The transaction associated with beginning time stamp 3 has status indicator indicating COMMITTED, a commit time stamp of 6, and parent ID of 1. The transaction associated with beginning time stamp 4 has status indicator indicating COMMITTED, a commit time stamp of 5, and a null parent ID (e.g., null parent ID indicates that the transaction is a top level parent). The transaction associated with beginning time stamp 6 has status indicator indicating FAILED, no commit time stamp, and parent ID of 4. The transaction associated with beginning time stamp 8 has status indicator indicating ACTIVE, no commit time stamp, and a parent ID of 4. The transaction associated with beginning time stamp 10 has status indicator indicating COMMITTED, commit time stamp of 11, and parent ID of 1.

In some embodiments, a child transaction is used to preserve isolation semantics in between multiple user transactions. A child transaction is allowed to fail at any time, but is only considered to be committed when the parent is also committed. When an operation is initiated, each independent server performs the computation with a child transaction, and commits independently. Should that server fail, the child transaction is rolled back and the operation may be safely retried. No work is made visible to other transactions until the parent transaction commits.

FIG. 5 is a diagram illustrating an embodiment of database data. In some embodiments, database data 500 comprises database data stored in database data storage 304 of FIG. 3. In the example shown, database data 500 comprises a log of events applied to a piece of data stored in the database. In various embodiments, events include a transaction begin, a transaction update, a transaction commit, a transaction rollback, a transaction fail, or any other appropriate transaction. In some embodiments, a transaction comprises an associated transaction identifier. In some embodiments, a transaction identifier comprises a pseudo-time value received from a pseudo-time generator (e.g., pseudo-time generator 252 of FIG. 2B). Each time the stored data is updated, the new stored data value is stored associated with the identifier associated with the transaction performing the update (e.g., "value@identifier"—e.g., "22@3", etc.). Each time a transaction is committed, the commit timestamp is stored associated with the identifier associated with the transaction being committed (e.g., "commit@identifier"—e.g., "4@3", etc.). In some embodiments, a transaction is not committed until all database data updates comprising the transaction (e.g., updates to various database data elements) are performed. In some embodiments, once all database data updates comprising a transaction are performed, the transaction is committed in a transaction table (e.g., transaction table 400 of FIG. 4). In some embodiments, after a transaction is committed in a transaction table, an indication is made to each database data element updated as part of the transaction that the transaction has been committed. In various embodiments, an indication to a database data element that a transaction has been committed is made immediately after the transaction is committed in the transaction table, at a predetermined time after the transaction is committed in the transaction table, at a time when system activity is low, when a second transaction requesting to update the database data is begun, or at any other appropriate time. In some embodiments, if a transaction performing an update to database data 500 has not been committed, it can be determined whether the transaction has been committed in the transaction table by looking up the transaction timestamp in the transaction table. Database data 500 includes entries associated with events t1 begin, t1 update, t1 commit, t3 begin, t3 update, t3 commit, t5 update, t5 rollback, t6 begin, t7 begin, t7 update, t6 update—FAIL, and t7 commit. The event t1 begin has timestamp 1, no value, and no commit timestamp. The event t1 update has no timestamp, value 21@1, and no commit timestamp. The event t1 commit has timestamp 2, no value, and commit timestamp 2@1. The event t3 begin has timestamp 3, no value, and no commit timestamp. The event t3 update has no timestamp, value 22@3, and no commit timestamp. The event t3 commit has timestamp 4, no value, and commit timestamp 4@3. The event t5 begin has timestamp 5, no value, and no commit timestamp. The event t5 update has no timestamp, value 23@5, and no commit timestamp. The event t5 rollback has no timestamp, no value, and no commit timestamp. The event t6 begin has timestamp 6, no value, and no commit timestamp. The event t7 begin has timestamp 7, no value, and no commit timestamp. The event t7 update has no timestamp, value 24@7, and no commit timestamp. The event t6 update-FAIL has no timestamp, no value, and no commit timestamp. The event t7 commit has timestamp 8, no value, and commit timestamp 8@7.

Figure 6:
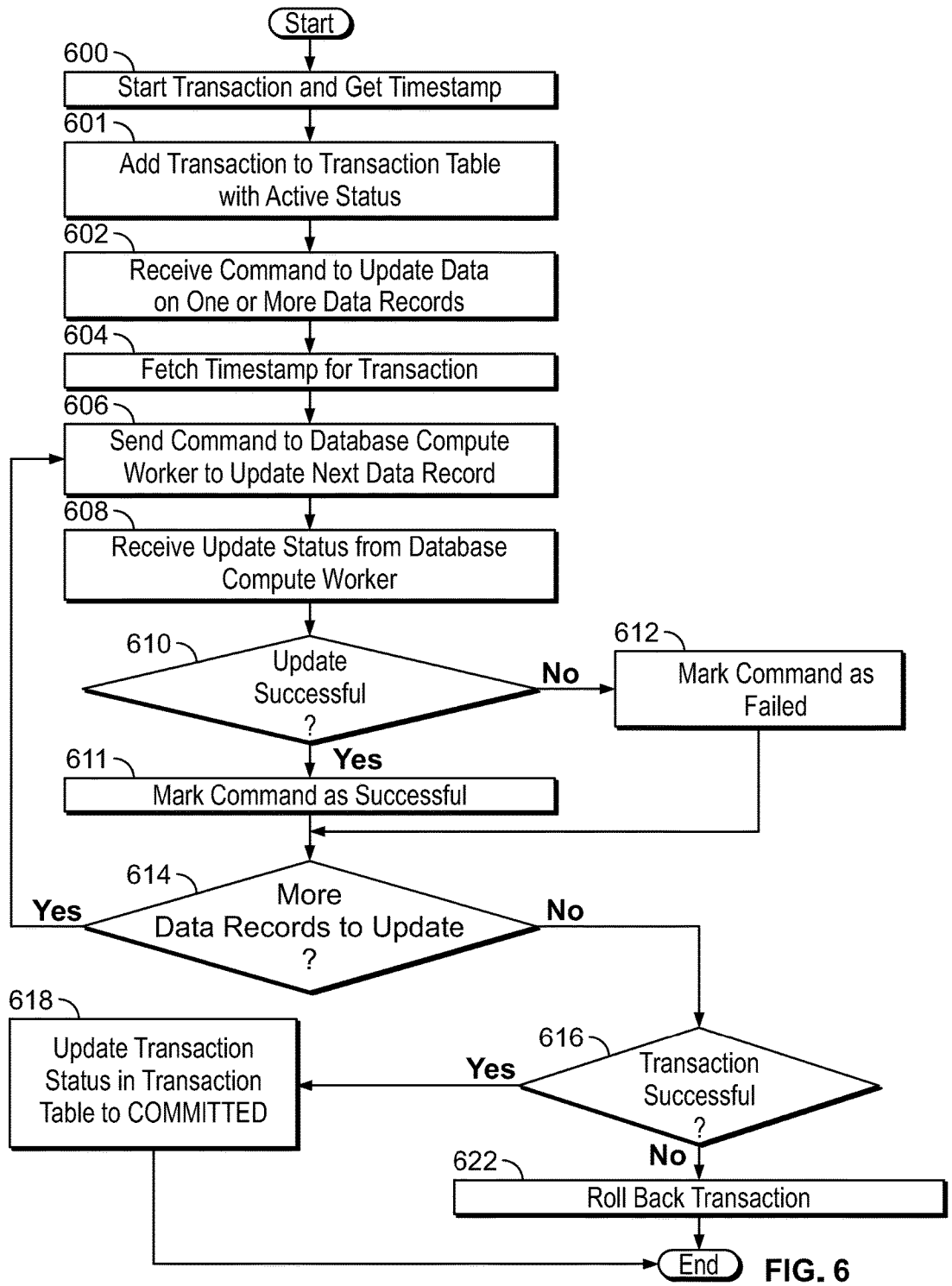
FIG. 6 is a flow diagram illustrating an embodiment of a process for updating data records.

FIG. 6 is a flow diagram illustrating an embodiment of a process for updating data records. In some embodiments, the process of FIG. 6 is executed by a global database server (e.g., global database server 102 of FIG. 1). In the example shown, in 600, a transaction is started and a timestamp is gotten. In 601, a transaction is added to the transaction table with active status. For example, a transaction representing the command to update data on one or more data records is added to a transaction table with ACTIVE status. In some embodiments, a timestamp is included in the transaction table. In 602, a command to update data on one or more data records is received. For example, a transaction is processed and during the processing determines an update for data. The data update is provided to the database. In some embodiments, the command to update data on one or more data records is received from a client system (e.g., client system 108 of FIG. 1). In 604, a timestamp is fetched for the transaction. For example, a timestamp is fetched from a pseudo-time generator (e.g., pseudo-time generator 252 of FIG. 2B). In 606, a command is sent to a compute worker to update the next data record. For example, as part of a transaction the system receives a command to update data and this is provided to a compute worker. In some embodiments, the next data record comprises the first data record. In 608, an update status is received from the computer worker. In 610, it is determined whether the update was successful. For example, it is determined from the update status received in 608 whether the update was successful. In the event that the update was not successful, control passes to 612. In 612, the command is marked as failed. In the event that it is determined in 610 that the update was successful, control passes to 611. In 611, the command is marked as successful and control passes to 614. In 614, it is determined whether there are more data records to update. In the event there are more data records to update, control passes to 606. In the event it is determined in 614 that there are not more data records to update, control passes to 616. In 616, it is determined whether the transaction is successful. In the event that the transaction was successful, control passes to 618. In some embodiments, the transaction fails in the event that any update is marked as failed. In some embodiments, the update is attempted a number of times before the transaction is deemed to have failed. In 618, the transaction status in the transaction table is updated to COMMITTED. In the event that the transaction was not successful, control passes to 622. In 622, the transaction is rolled back. For example, the transaction is rolled back, and the process ends. In some embodiments, rolling back the transaction comprises rolling back previous data record updates made as part of the transaction. In some embodiments, rolling back the transaction comprises updating the transaction status in the transaction table to ROLLED-BACK. In some embodiments, rolling back the transaction comprises waiting a predetermined period of time and re-attempting the transaction.

In some embodiments, a transaction is more complex (e.g., with multiple read and update operations) in which case 618 and 620 are performed after all steps of the transaction are complete.

Figure 7:
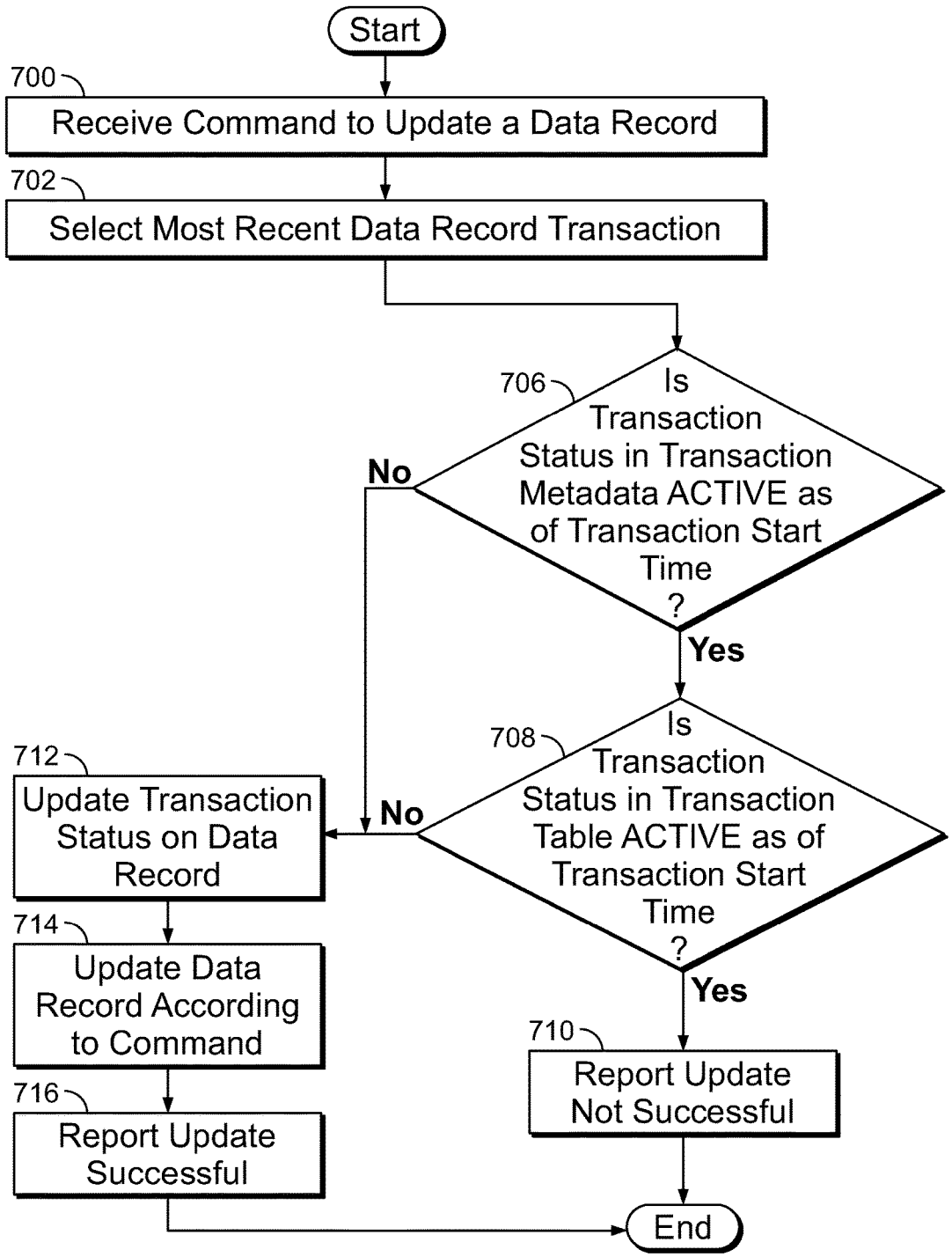
FIG. 7 is a flow diagram illustrating an embodiment of a process for updating data.

FIG. 7 is a flow diagram illustrating an embodiment of a process for updating data. In some embodiments, the process of FIG. 7 is performed by a database compute worker (e.g., compute worker 206 of FIG. 2A). In the example shown, in 700, a command to update a data record is received. In some embodiments, a command to update a data record is received from a global database server (e.g., global database server 102 of FIG. 1). In 702, the most recent data record transaction is selected (e.g., the most recent transaction associated with the data record to be updated). In some embodiments, the current value of the value is retrieved and/or the transaction context is acquired. In 706, it is determined whether the transaction status as stored in the transaction metadata (e.g., local transaction table metadata 302 of FIG. 3) is ACTIVE as of transaction start time. In the event the transaction status in the transaction metadata is ACTIVE, control passes to 708. In the event the transaction status in the transaction metadata is determined not to be ACTIVE in 706, control passes to 712. In 708, it is determined whether the transaction status as stored in the transaction table (e.g., transaction table 206 of FIG. 2) is ACTIVE. In the event the transaction status in the transaction table is ACTIVE, control passes to 710. In 710, the process reports that the update was not successful, and the process ends. In the event that the transaction status in the transaction table is determined not to be ACTIVE in 708, control passes to 712. In 712, the transaction status on the data record is updated (e.g., to the value determined from the transaction metadata or the transaction table). In 714, the data record is updated according to the command. For example, the data record is updated according to the command received and the data value for updating (e.g., the command received in 700). In 716, the process reports that the update was successful.

In some embodiments, there is not a transaction metadata on the server (e.g., the region server) in that case 706 is omitted in the process flow.

Figure 8:
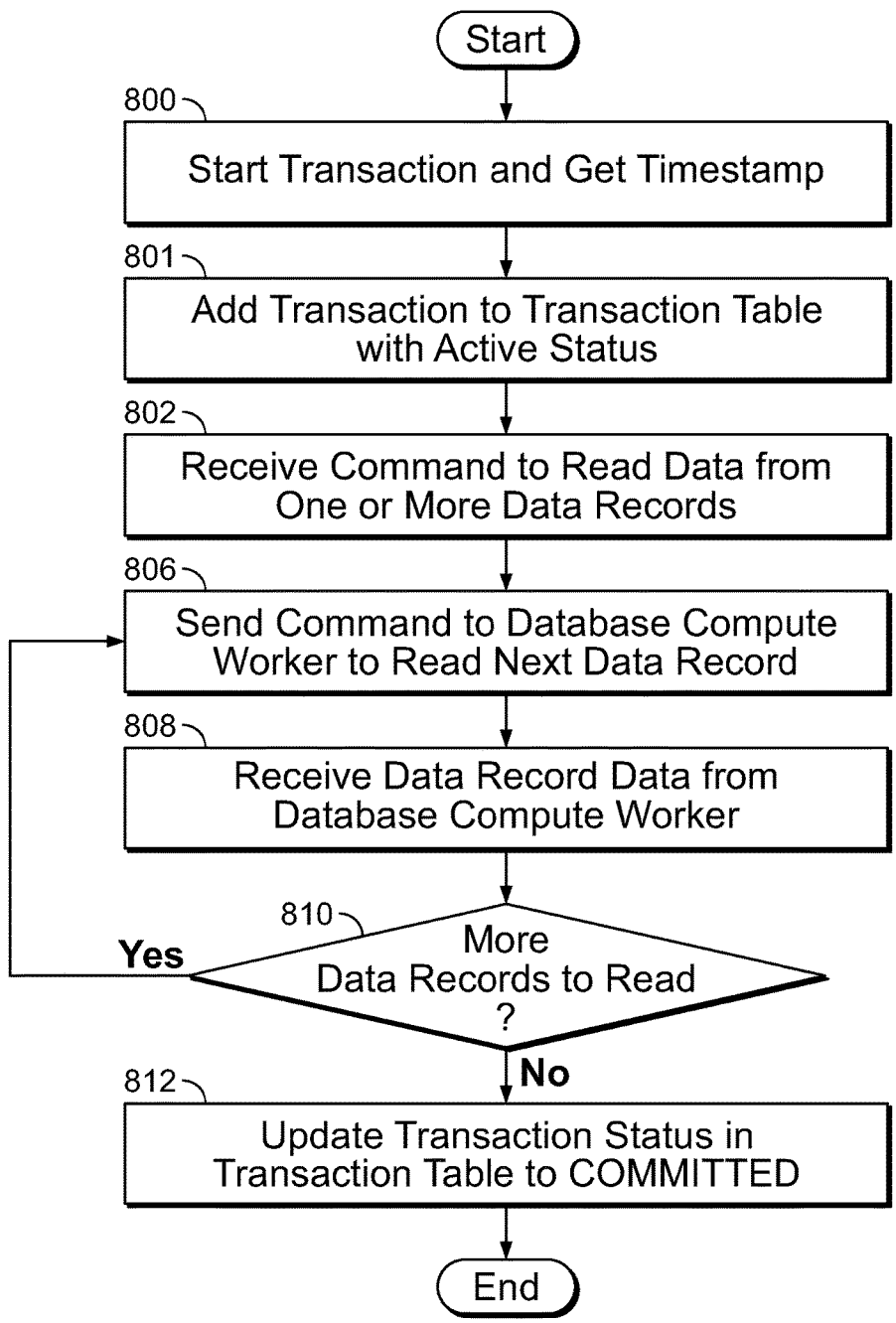
FIG. 8 is a flow diagram illustrating an embodiment of a process for reading data.

FIG. 8 is a flow diagram illustrating an embodiment of a process for reading data. In some embodiments, the process of FIG. 8 is executed by a global database server (e.g., global database server 102 of FIG. 1). In the example shown, in 800 the transaction is started and a timestamp is gotten. In 801, a transaction is added to the transaction table with active status. For example, a transaction is added to the transaction table representing the command to read data on one or more data records. In some embodiments, the timestamp gotten in 802 is included in the transaction table. In 802, a command to read data from one or more data records is received. For example, a transaction is processed and during the processing includes a reading of data. In some embodiments, the command to read data on one or more data records is received from a client system (e.g., client system 108 of FIG. 1). In 806, a command is sent to a compute worker to read the next data record. For example, the transaction requires a read of data and the command to read the data on the compute worker is sent to the compute worker. In some embodiments, the next data record comprises the first data record. In 808, data record data is received from the compute worker. For example, the region server determines the data record data and provides the data record data to a global database server. In some embodiments, determining the data record data comprises determining the value of the data record data after the most recent transaction with COMMITTED status. In 810, it is determined whether there are more data records to read. If it is determined in 810 that there are more data records to read, control passes to 806. If it is determined in 810 that there are not more data records to read, control passes to 812. In 812, the transaction status in the transaction table is updated to COMMITTED.

In some embodiments, a transaction is more complex (e.g., with multiple read and update operations) in which case 812 is performed after all steps of the transaction are complete.

Figure 9:
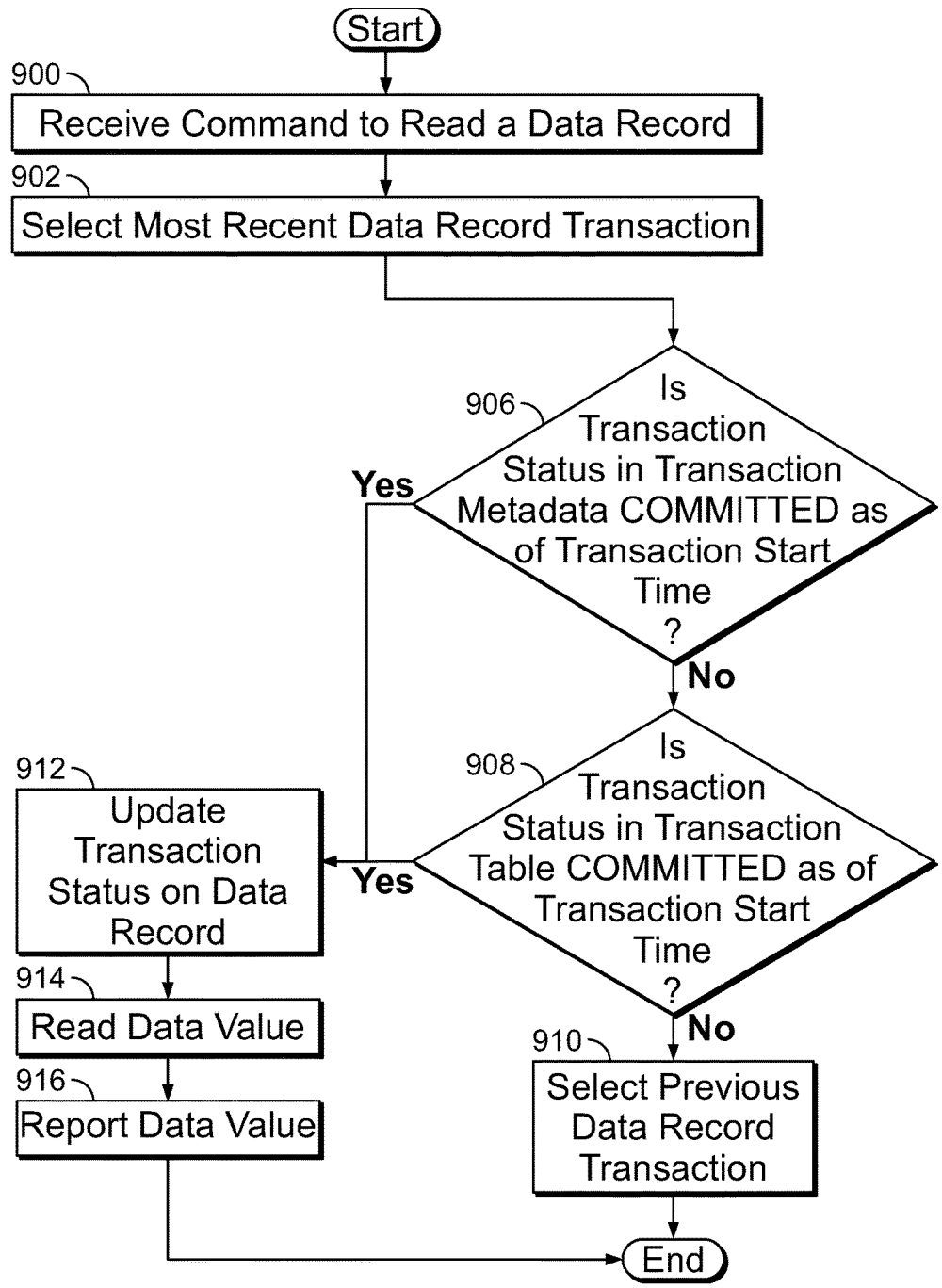
FIG. 9 is a flow diagram illustrating an embodiment of a process for reading data.

FIG. 9 is a flow diagram illustrating an embodiment of a process for reading data. In some embodiments, the process of FIG. 9 is performed by a database compute worker (e.g., compute worker 206 of FIG. 2A). In the example shown, in 900, a command to read a data record is received. In some embodiments, a command to read a data record is received from a global database server (e.g., global database server 102 of FIG. 1). In 902, the most recent data record transaction is selected (e.g., the most recent transaction associated with the data record to be read). In 906, it is determined whether the transaction status as stored in the transaction metadata (e.g., local transaction table metadata 302 of FIG. 3) is COMMITTED as of transaction start time. In the event the transaction status in the transaction metadata is not COMMITTED, control passes to 908. In the event the transaction status in the transaction metadata is determined to be COMMITTED in 906, control passes to 912. In 908, it is determined whether the transaction status as stored in the transaction table (e.g., distributed transaction table 308 of FIG. 3) is COMMITTED. In the event the transaction status in the transaction table is not COMMITTED, control passes to 910. In 910, the process selects the previous data record transaction, and control passes to 904. In the event that the transaction status in the transaction table is determined to be COMMITTED in 908, control passes to 912. In 912, the transaction status on the data record is updated (e.g., to the value determined from the transaction metadata or the transaction table). In 914, the data record value is read. For example, the data record value is read as it is recorded after the most recent transaction determined to be COMMITTED. In 916, the process reports the data value read in 914.

In some embodiments, there is not a transaction metadata on the server (e.g., the region server) in that case 906 is omitted in the process flow.

Figure 10:
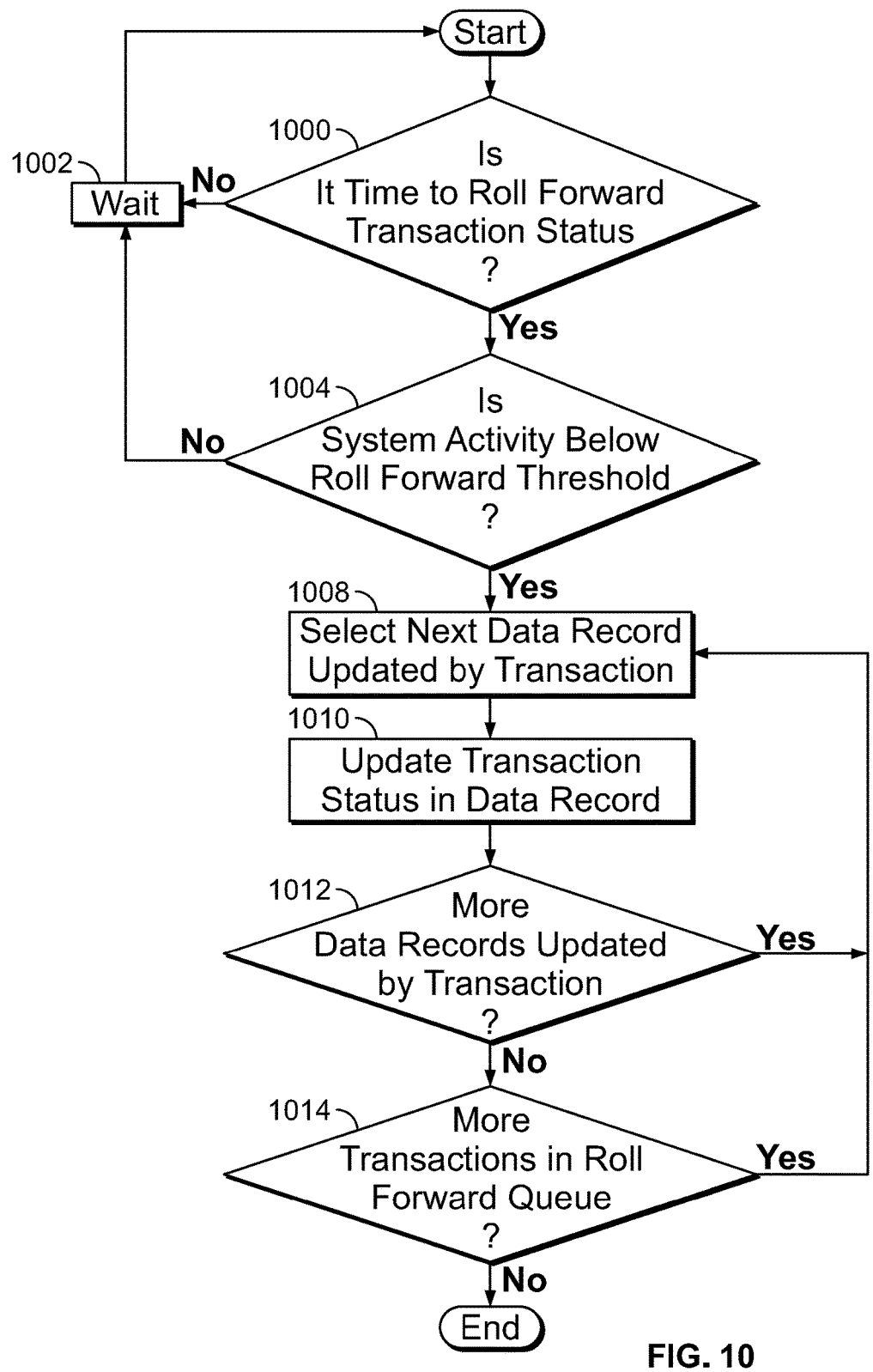
FIG. 10 is a flow diagram illustrating an embodiment of a process for rolling forward a roll forward queue.

FIG. 10 is a flow diagram illustrating an embodiment of a process for rolling forward a roll forward queue. In some embodiments, a roll forward queue comprises a set of COMMITTED transactions that have not had their status as stored in the updated data records changed to COMMITTED. In some embodiments, a transaction is added to the roll forward queue after all updates for the transaction have been made and the transaction status has been changed to COMMITTED in the transaction table (e.g., in 618 of FIG. 6). In some embodiments, a transaction is added to the roll forward queue rather than updating the status of the transaction in the updated data rows immediately in order to put off the necessary processing until a point when system activity is low. In the example shown, in 1000, it is determined whether it is time to roll forward the transaction status. In various embodiments, it is time to roll forward transaction status once an hour, once a day, every day at 3 PM and at midnight, every time a roll forward command is received from a user, or at any other appropriate time. In the event it is determined that it is not time to roll forward transaction status, control passes to 1002. In 1002, the process waits. In various embodiments, the process waits one second, one minute, one hour, or any other appropriate period of time. Control then passes to 1000. In the event it is determined in 1000 that it is time to roll forward the transaction status, control passes to 1004. In 1004, it is determined whether the system activity is below the roll forward threshold. In various embodiments, the roll forward threshold comprises a processor activity threshold, a disk activity threshold, a network activity threshold, or any other appropriate threshold. If it is determined that system activity is not below the roll forward threshold, control passes to 1002. If it is determined in 1004 that system activity is below the roll forward threshold, control passes to 1008. In 1008, the next data record updated by the selected transaction is selected. In 1010, the transaction status in the selected data record is updated. For example, the transaction status is updated in a data record to COMMITTED if successful or if it is rolled back or failed the row is removed. In 1012, it is determined if there are more data records updated by the selected transaction. In the event there are more data records updated by the selected transaction, control passes to 1008. In the event it is determined in 1012 that there are not more data records updated by the transaction, control passes to 1014. In 1014, it is determined whether there are more transactions in the roll forward queue. In the event there are more transactions in the roll forward queue, control passes to 1008. In the event it is determined in 1014 that there are not more transactions in the roll forward queue, the process ends.

Figure 11:
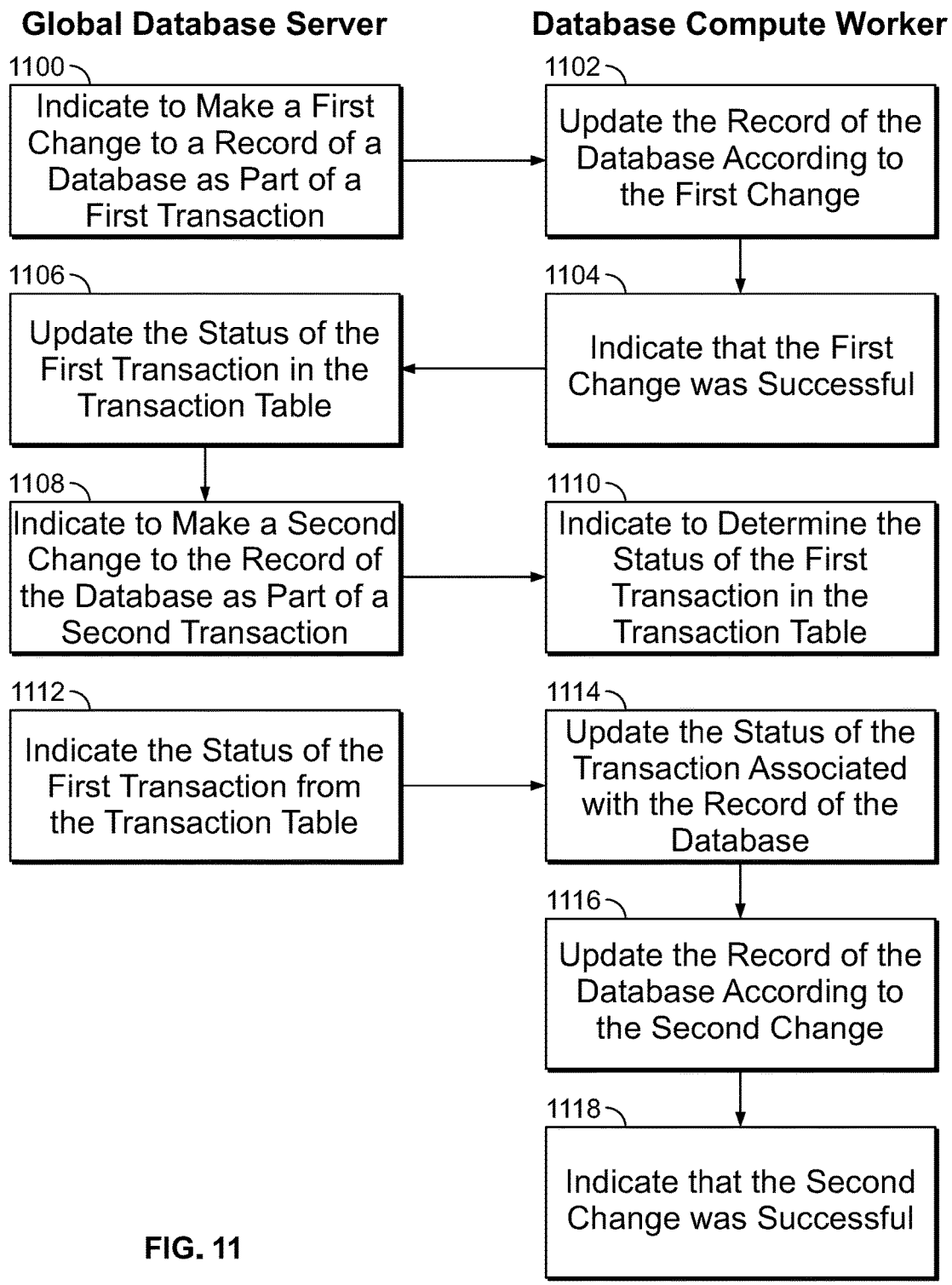
FIG. 11 is a diagram illustrating an embodiment of communication between a global database server and a database compute worker.

FIG. 11 is a diagram illustrating an embodiment of communication between a global database server and a database compute worker. In some embodiments, the global database server of FIG. 11 is used to implement global database server 102 of FIG. 1. In some embodiments, the compute worker of FIG. 11 is used to implement compute worker 206 of FIG. 2A. In the example shown, in 1100, the global database server indicates (e.g., to the database compute worker) to make a first change to a record of a database as part of a first transaction. In 1102, the database compute worker updates the record of the database according to the first change. In 1104, the database compute worker indicates (e.g., to the global database server) that the first change was successful. In 1106, the global database server updates the status of the first transaction in the transaction table (e.g., to COMMITTED). In the example shown, the global database server does not provide an indication to update the status of the first transaction associated with the record of the database. In 1108, the global database server indicates to make a second change to the record of the database (e.g., the same record as was indicated to be changed in 1100) as part of a second transaction. In 1110, the database compute worker indicates to determine the status of the first transaction in the transaction table. In some embodiments, the database compute worker indicates to determine the first transaction in the transaction table because the status of the transaction associated with the record is pending (e.g., ACTIVE). In 1112, the global database server indicates the status of the first transaction from the transaction table. In 1114, the database compute worker updates the status of the transaction associated with the record of the database. In 1116, the database compute worker updates the record of the database according to the second change. In 1118, the database compute worker indicates that the second change was successful.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for executing a plurality of transactions, comprising:
a first processor, configured to:
execute a first transaction, comprising:
adding the first transaction to a transaction table;
providing a plurality of indications to make a plurality of first changes to a plurality of first records of a database;
determining whether the plurality of first changes to the plurality of first records have been made; and
in response to a determination that the plurality of first changes to the plurality of first records have been made, committing the first transaction by updating a status of the first transaction in the transaction table to a committed status and updating the transaction table to include a first transaction commit time while not providing an indication to update the status of the first transaction associated with the plurality of first records from a pending status; and
a memory coupled to the first processor and configured to store the transaction table.

2. The system of claim 1, wherein the first processor is further configured to:
execute a second transaction that affects at least one record of the plurality of records.

3. The system of claim 2, wherein executing the second transaction that affects the at least one record of the plurality of records comprises:
receiving an indication to determine the status of the first transaction in the transaction table.

4. The system of claim 1, further comprising:
a second processor, configured to:
receive an indication to make a change to record of the plurality of first records as part of the first transaction.

5. The system of claim 4, wherein the second processor is further configured to:
receive an indication to make a change to record of the plurality of first records as part of a second transaction.

6. The system of claim 5, wherein the second processor is further configured to determine the status of the first transaction associated with the record of the plurality of first records.

7. The system of claim 5, wherein the second processor is further configured to determine the status of the first transaction in a transaction metadata.

8. The system of claim 7, wherein the second processor is further configured to:
in the event the status of the first transaction in the transaction metadata comprises committed, update the status of the first transaction associated with the record of the plurality of first records.

9. The system of claim 7, wherein the second processor is further configured to provide an indication to determine the status of the first transaction in the transaction table.

10. The system of claim 9, wherein the second processor is further configured to:
in the event the status of the first transaction in the transaction table comprises committed, update the status of the first transaction associated with the record of the plurality of first records.

11. The system of claim 9, wherein the second processor is further configured to:
in the event the status of the first transaction in the transaction table comprises committed, update the status of the first transaction in the transaction metadata.

12. The system of claim 1, wherein executing the first transaction further comprises:
adding the first transaction to a roll forward queue.

13. The system of claim 12, wherein the first processor is further configured to:
provide an indication to update the transaction status of a record of the plurality of first records updated by a transaction in the roll forward queue.

14. The system of claim 13, wherein the first processor is configured to provide an indication to update the transaction status of the record of the plurality of first records updated by a transaction in the roll forward queue at a predetermined point in time.

15. The system of claim 13, wherein the first processor is configured to provide an indication to update the transaction status of the record of the plurality of first records updated by a transaction in the roll forward queue if system activity is below a roll forward threshold.

16. The system of claim 1, wherein the committing the first transaction by updating the status of the first transaction in the transaction table comprises committing the execution of the first transaction in the event of any future data state recovery or rollback operations.

17. The system of claim 1, wherein the transaction table is stored in a durable memory.

18. The system of claim 1, wherein the memory coupled to the first processor and configured to store the transaction table comprises a distributed database.

19. A method for executing a plurality of transactions, comprising:
executing a first transaction, using a processor, comprising:
adding the first transaction to a transaction table;
providing a plurality of indications to make a plurality of first changes to a plurality of first records of a database;
determining whether the plurality of first changes to the plurality of first records have been made; and
in response to a determination that the plurality of first changes to the plurality of first records have been made, committing the first transaction by updating a status of the first transaction in the transaction table to a committed status and updating the transaction table to include a first transaction commit time while not providing an indication to update the status of the first transaction associated with the plurality of first records from a pending status.

20. A computer program product for executing a plurality of transactions, the computer program product being embodied in a non-transitory computer readable storage medium and comprising computer instructions for:
executing a first transaction, using a processor, comprising:
adding the first transaction to a transaction table;
providing a plurality of indications to make a plurality of first changes to a plurality of first records of a database;
determining whether the plurality of first changes to the plurality of first records have been made; and
in response to a determination that the plurality of first changes to the plurality of first records have been made, committing the first transaction by updating a status of the first transaction in the transaction table to a committed status and updating the transaction table to include a first transaction commit time while not providing an indication to update the status of the first transaction associated with the plurality of first records from a pending status.

21. The system of claim 1, wherein the first processor is further configured to provide the status of the first transaction in the transaction table to a second transaction.

22. The system of claim 21, wherein the second transaction updates a status of the first transaction associated with a record of the plurality of first records from a pending status to a committed status in the event that the status of the first transaction in the transaction table is committed and in the event that the first transaction commit time is before a start time of the second transaction.

23. The system of claim 22, wherein the second transaction updates the record of the plurality of first records in the event that the status of the first transaction associated with the record of the plurality of first records is updated to a committed status.

24. The system of claim 22, wherein the second transaction reads the record of the plurality of first records in the event that the status of the first transaction associated with the record of the plurality of first records is updated to a committed status.

* * * * *

UNITED STATES PATENT AND TRADEMARK OFFICE
CERTIFICATE OF CORRECTION

PATENT NO. : 10,013,447 B2
APPLICATION NO. : 14/720475
DATED : July 3, 2018
INVENTOR(S) : John Leach et al.

Page 1 of 1

It is certified that error appears in the above-identified patent and that said Letters Patent is hereby corrected as shown below:

In the Specification

Column 4, Line 26, after "database", delete "sever" and insert --server--, therefor.

In the Claims

Column 18, Claim 4, Line 65, after "change to", insert --a--.
Column 19, Claim 5, Line 3, after "change to", insert --the--.

Signed and Sealed this
Thirteenth Day of November, 2018

Andrei Iancu
*Director of the United States Patent and Trademark Office*